United States Patent [19]

Sasaki et al.

[11] Patent Number: 4,742,285
[45] Date of Patent: May 3, 1988

[54] FULL FOLLOW-UP TYPE SERVO-SYSTEM

[75] Inventors: Yoshinari Sasaki, Shunto; Jun Fujita, Numazu, both of Japan

[73] Assignee: Toshiba Kikai Kabushiki Kaisha, Tokyo, Japan

[21] Appl. No.: 21,264

[22] Filed: Mar. 3, 1987

[30] Foreign Application Priority Data

Mar. 14, 1986 [JP] Japan .................................. 61-56506

[51] Int. Cl.$^4$ .......................................... G05D 23/275
[52] U.S. Cl. .................... 318/632; 318/636; 318/808
[58] Field of Search ......................... 318/632, 636, 808

[56] References Cited

U.S. PATENT DOCUMENTS

4,484,126 11/1984 Fulton et al. ...................... 318/800
4,651,272 3/1987 El-Ibiary et al. ............... 318/632 X Primary Examiner—William M. Shoop, Jr.
Assistant Examiner—M. Bergmann
Attorney, Agent, or Firm—Koda and Androlia

[57] ABSTRACT

In a servo-system of a conventional numerical control (NC) device, a delay in response or deformation is always observed on an output side with respect to an inputted speed command or position command and an actual output response behaves differently from a command value. Such delay or deformation of the output response constitutes a significant problem particularly in case of controlling one object simultaneously by a plurality of servo-system, which results in a remarkable defect in a controlling performance. According to this invention, when a transfer function of a servo-system of the type comprising a control system and a control object is designated by W, a device or a signal conversion system with an inverse function 1/W of the transfer function W is located a a pre-compensation system in advance of the control system thereby to input a speed or position to be controlled into the pre-compensation system. Thus, according to this invention, the output response to the inputted speed or position command can fully follow up, and moreover, in a system provided with a plurality of servo-system, the respective servo-system can be controlled with substantial no delay in response, so that it is possible to precisely control one object. Particularly, in a case where the servo-system of this invention is utilized for an NC device for a machine tool, a working operation with no working error can be realized especially in an arc cutting operation.

6 Claims, 7 Drawing Sheets

FULL FOLLOW-UP TYPE SERVO-SYSTEM

BACKGROUND OF THE INVENTION

This invention relates to a full follow-up type servo-system adapted to attain extremely accurate control of speed and position in a servo-system with no time delay.

Figure 1:
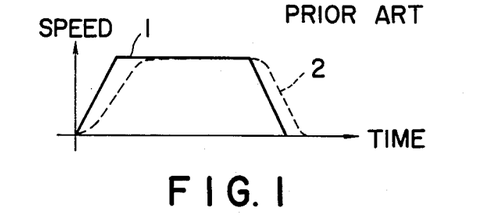
FIG. 1 is a chart for explaining an output response to an input command of an ordinary servo-system.

In a conventional servo-system, on the output side, is always observed a time delay in response with respect to an inputted speed command or position command, and accordingly, the actual output response is operated differently from the command value. As shown in FIG. 1, for example, the actual response will be represented by a high dimensional curve, i.e. broken line 2 in spite of a tinpezoid-shaped linear acceleration/deceleration command represented by the solid line 1. The deformation of this character in the output response is a significant problem in a case where one object is controlled by a plurality of servo-systems, which will result in a remarkable defect in the controlling performance.

Figure 2:
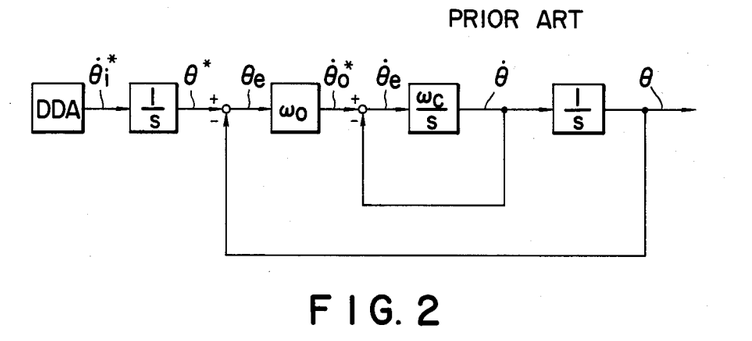
FIG. 2 is a block diagram of an ordinary servo-system in a numerical control device.
Figure 3:
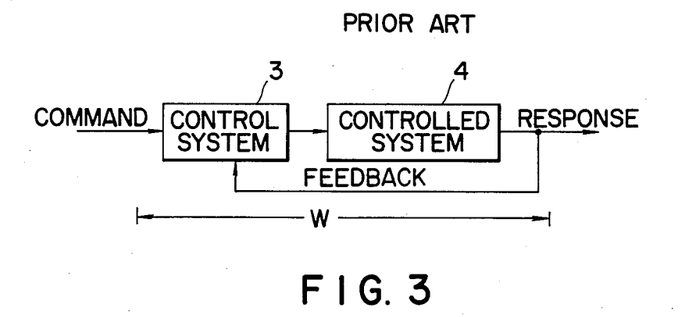
FIG. 3 is a view for explaining a concept of an ordinary servo-system.

In a numerical control device provided with an ideal electric minor loop (gain "1" up to the frequency "∞"; no current saturation), the transfer function in an ordinary servo-system is represented by a block diagram of FIG. 2 and also shown in FIG. 3 as a general concept of a block representing a control system 3 and a controlled system 4. Namely, in FIG. 2 $\dot{\theta}_i^*$ (rad/sec) represents a speed command due to a DDA (Digital Differential Analyzer), $\theta^*$ (rad) is a position command and $\theta$ represents the output position of the controlled system 4. Accordingly, $\theta_e$ (rad) represents the position deviation, which is then inputted into a position loop system (position loop gain $\omega_o$). The position deviation $\theta_e$ in the position loop system because speed command $\dot{\theta}_o^*$ (rad/sec) and the deviation $\dot{\theta}_e$ between the speed command $\dot{\theta}_o^*$ and the speed $\dot{\theta}$ (rad/sec) is inputted into a speed control system (speed loop gain $\omega_c$). FIG. 3 shows that a response, i.e. transfer function, to the input command of the output based on the control system 3 and the controlled system 4 is "W" at a time when the speed command and the position command are inputted into the control system 3.

In the servo-system of this type, however, the position deviation $\theta_e$ does not become "0" except for an operation stopping time thereof. That is, when the inputted speed command $\dot{\theta}_i^*$ is constant, a constant position deviation $\theta_e$ is always generated and when the speed command $\dot{\theta}_i^*$ varies, the position deviation $\theta_e$ also varies. For this reason, in a case where a workpiece is cut circularly by means of a machine tool in a controlled system, for example, a working error will be liably caused.

SUMMARY OF THE INVENTION

An object of this invention is to eliminate the defects in prior art and to provide a full follow-up type servo-system in which an output completely follows up and a response with no delay to input commands of speed and position can be obtained.

Another object of this invention is to provide a full follow-up servo-system particularly constituted by a digital circuit.

These and other objects can be achieved, according to this invention, by providing a full follow-up type servo-system wherein when a transfer function of a servo-system comprising a control system and a controlled system is designated by W, a pre-compensation system with a inverse function 1/W of the transfer function is further located in advance of the control system thereby to input a control command into the pre-compensation system. The control command is specifically related to a speed command and/or a position command, and the pre-compensation system generally comprises proportional and differential elements.

The nature, principle and utility of the invention will become more apparent from the following detailed description when read in conjunction with the accompanying drawings.

DESCRIPTION OF THE PREFERRED EMBODIMENTS

Figure 4:
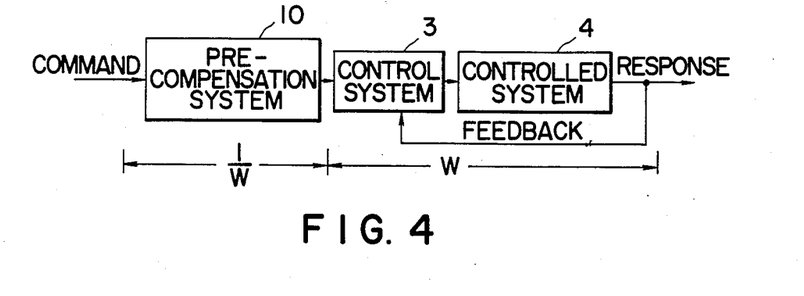
FIG. 4 is a view for explaining a concept of a servo-system including a pre-compensation system according to this invention.

FIG. 4 shows a block diagram of a servo-system according to this invention, which is provided with the inverse function 1/W of the transfer function W of a conventional servo-system comprising a control system 3 and a controlled system 4 as a pre-compensation system 10 which is to be located in advance of the control system 3 and into which commands regarding the speed and position are inputted.

Hereinafter are described processes for determining the pre-compensation system 10 of this invention used for performing the control to fully follow up the speed command and the position command in a general servo-system for carrying out the speed control and the position control.

The processes for the speed control will be first explained hereunder.

Figure 5:
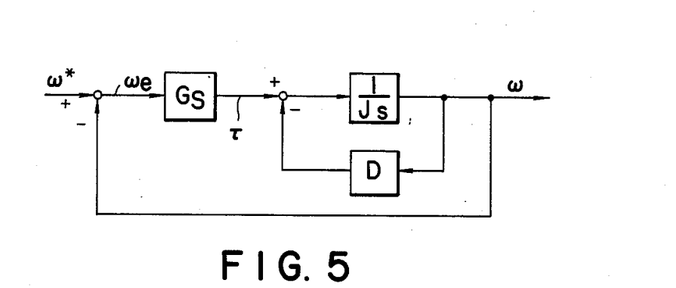
FIG. 5 is a block diagram of a general type speed control system to which this invention is applicable.

FIG. 5 shows a block diagram of an ordinary speed control system for controlling the output to a speed $\omega$ with respect to the input of a speed command value $\omega^*$, and the transfer function $W_s(s)$ of this speed control system is obtained as follows.

According to the diagram of FIG. 5, the following equation (1) is obtained $$\omega = \frac{1}{Js}(\tau - D \cdot \omega) \quad (1)$$

$$\left(1 + \frac{D}{Js}\right)\omega = \frac{D}{Js}\tau$$

From this equation (1) the speed $\omega$ is expressed as the below quation (2).

$$\omega = \frac{1}{Js + D} \cdot \tau = \frac{1}{Js + D} G_s \cdot (\omega^* - \omega) \quad (2)$$

$$\left(1 + \frac{G_s}{Js + D}\right)\omega = \frac{G_s}{Js + D}\omega^*$$

The speed $\omega$ is the expressed as the following equation (3).

$$\omega = \frac{G_s}{Js + D + G_s}\omega^* \quad (3)$$

Accordingly, the transfer function $W_s(s)$ is as follows.

$$W_s(s) = \frac{\omega}{\omega^*} = \frac{G_s}{Js + D + G_s} \quad (4)$$

In the above equation (4) $W_e$ represents a speed deviation, $\tau$ is a torque command value, $G_s$ is a speed gain, J is an inertia moment and D is a viscosity friction.
Since the speed deviation $\omega_e$ is expressed as $\omega_e = (\omega^* - \omega)$, it will be expressed as the following equation (5) by substituting the equations (2) and (3).

$$\omega_e = \omega^* - \omega = \frac{Js + D}{Js + D + G_s}\cdot \omega^* \quad (5)$$

The steady-state response to the stepped speed command $\omega^*$ is accordingly as follows.

$$\lim_{t \to \infty} \omega_e = \lim_{s \to 0} s \cdot \frac{Js + D}{Js + D + G_s} \cdot \frac{1}{s} = \frac{D}{D + G_s} \quad (6)$$

This equation (6) shows that the response cannot follow by the component corresponding to the friction.

The transfer function $H_s(s)$ of the pre-compensation system 10 is then expressed as follows with the reverse function of the transfer function $W_s$ represented in the equation (1).

$$H_s(s) = \frac{1}{W_s(s)} = \frac{Js + D + G_s}{G_s} \quad (7)$$

$$= \frac{J}{G_s}s + \frac{D}{G_s} + 1$$

Figure 6:
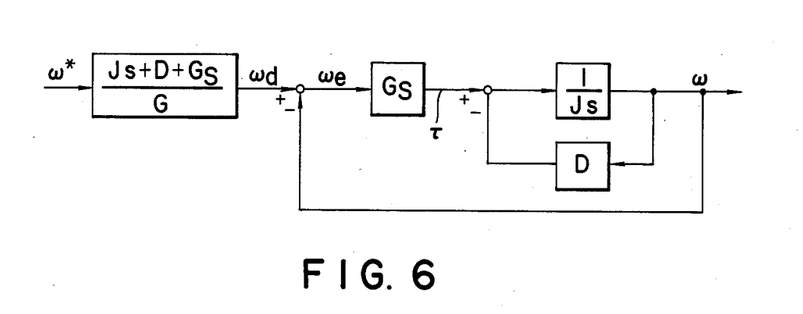
FIG. 6 is a block diagram of a servo-system which is constituted by combining the pre-compensation system of this invnetion with the servo-system shown in FIG. 5.
Figure 7:
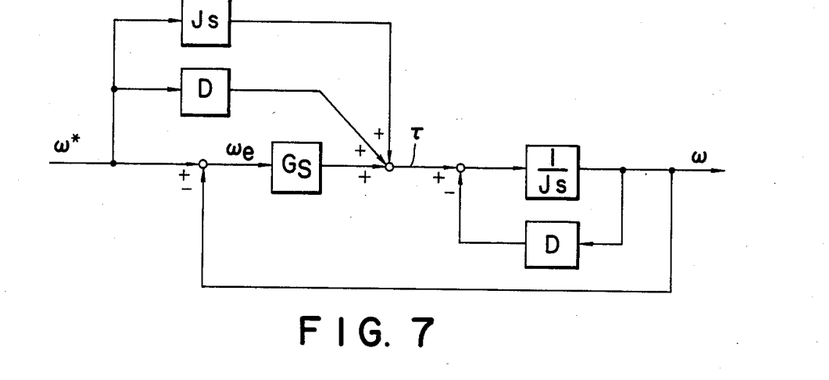
FIG. 7 is a block diagram of the type deforming the compensation method of the system shown in FIG. 6.

A servo-system compensated for by the transfer function $H_s(s)$ of the pre-compensation system 10 is shown in FIG. 6, which will be deformed in accordance with the equation (7) into FIG. 7. In the case of FIG. 6, the speed command $\omega^*$ is compensated for as a command value $\omega_d$, and in the case of FIG. 7, the torque command value $\tau$ is compensated for through the feed-forward loop.

In the case of FIG. 7, the speed deviation $\omega_e$ is expressed as follows.

$$\omega_e = \omega^* - \omega = 0 \quad (8)$$

It is found from this equation that the output response always accords with the input command value $\omega^*$.

In the next stage, the position controlling processes or steps will be explained.

Figure 8:
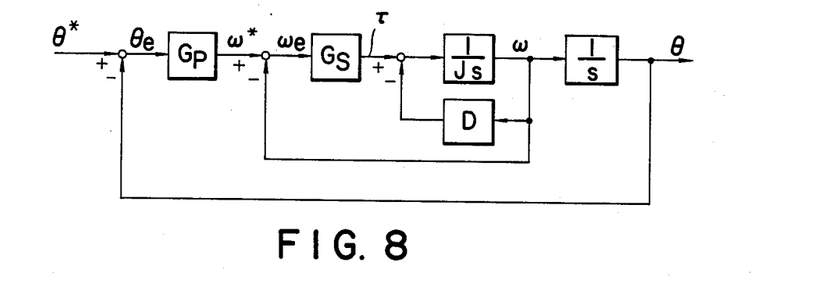
FIG. 8 is a block diagram of a general type of a position control system to which this invention is applicable.

FIG. 8 shows a block diagram of a general position control system for controlling the output to the position $\theta$ in accordance with the input of the position command value $\theta^*$, in which the transfer function $W_P(s)$ of the position control system is obtained in accordance with the following process. An equation (9) is established from the block diagram of FIG. 8.

$$\theta = \frac{1}{s}\omega \quad (9)$$

The equation (4) is substituted for the above equation (9).

$$\theta = \frac{G_s}{s(Js + D + G_s)}\omega^* \quad (10)$$

$$= \frac{G_s \cdot G_p}{s(Js + D + G_s)}\cdot(\theta^* - \theta)$$

$$\left(1 + \frac{G_s \cdot G_p}{s(Js + D + G_s)}\right)\theta = \frac{G_s \cdot G_p}{s(Js + D + G_s)}\theta^*$$

Accordingly, the position $\theta$ and the transfer function $W_P(s)$ of the position control system will be expressed as follows.

$$\theta = \frac{G_s \cdot G_p}{Js^2 + (D + G_s)s + G_s \cdot G_p}\theta^* \quad (11)$$

$$W_P(s) = \frac{\theta}{\theta^*} = \frac{G_s \cdot G_p}{Js^2 + (D + G_s)s + G_s \cdot G_p} \quad (12)$$

Wherein $\dot{\theta}_e$ is a position deviation and $G_P$ is a position loop gain. Since the position deviation $\dot{\theta}_e$ is expressed as $(\theta^* - \theta)$, the deviation $\dot{\theta}_e$ will be accordingly obtained as follows from the equations (10) and (11).

$$\theta_e = \theta^* - \theta = \frac{s(Js + D + G_s)}{Js^2 + (D + G_s)s + G_s \cdot G_p} \theta^* \quad (13)$$

The steady-state response to a ramp-shaped position command $\theta^*$ is as follows and it is found that the constant speed deviation is generated.

$$\lim_{t \to \infty} \theta_e = \lim_{s \to 0} s \cdot \frac{s(Js + D + G_s)}{Js^2 + (D + G_s)s + G_s \cdot G_p} \cdot \frac{1}{s^2} \quad (14)$$

$$= \frac{D + G_s}{G_s \cdot G_p}$$

In the subsequent step, the transfer function $H_P(s)$ of the pre-compensation system is given by the inverse function of the transfer function $W_P(s)$ of the equation (12) in the manner similar to that described hereinbefore with respect to the case of the speed control. Namely, the transfer function $H_P(s)$ of the pre-compensation system 11 in case of the position control is as follows.

$$H_P(s) = \frac{1}{W_P(s)} = \frac{Js^2 + (D + G_s)s + G_s \cdot G_p}{G_s \cdot G_p} \quad (15)$$

$$= \frac{J}{G_s \cdot G_p} s^2 + \frac{D + G_s}{G_s \cdot G_p} s + 1$$

Figure 9:
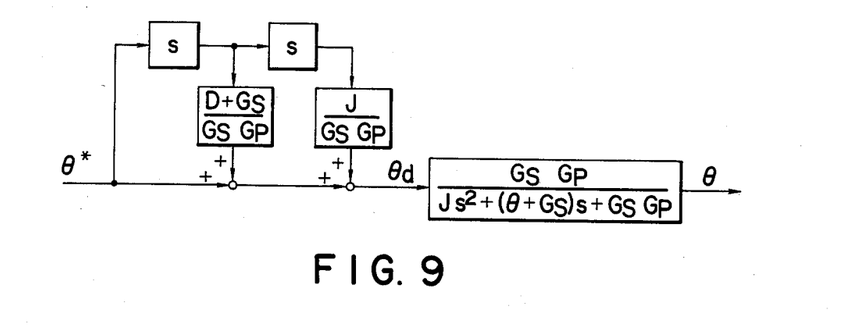
FIG. 9 is a block diagram of a servo-system which is constituted by combining the pre-compensation system of this invention with the servo-system shown in FIG. 8.
Figure 10:
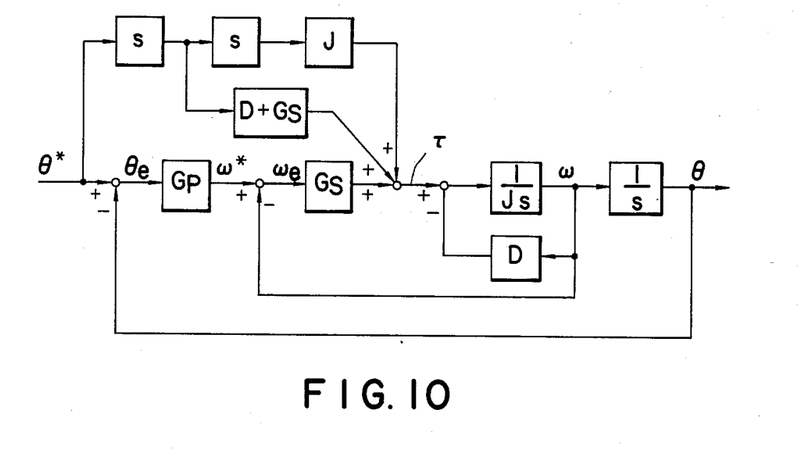
FIG. 10 is a block diagram of the type deforming the compensation method of the system shown in FIG. 9.

Accordingly, a position control system compensated for by the pre-compensation system 10 represented by the equation (15) is shown in FIG. 9, which will be deformed to FIG. 10. In the case of FIG. 9, the position command value $\theta_d$ is compensated for and in the case of FIG. 10, the torque command value $\tau$ is compensated for through the feedforward loop. In the case of FIG. 10, the position command value $\theta_e$ is expressed by the following equation (16) and the response of the output $\theta$ always accords with the input command $\theta^*$.

$$\theta_e = \theta^* - \theta = 0 \quad (16)$$

As described hereinabove, it is found that, by locating the pre-compensation system with the inverse function $1/W$ of the transfer function $W$ of a servo-system for the control system 3 and the controlled system 4, the speed deviation is always "0" in case of the speed control and the position deviation is also always "0" in case of the position control. In the actual control device, however, it is necessary to generate a torque exactly based on the torque command value $\tau$. This condition may not be satisfied in some time at the starting or stopping time of the cutting feed process in which the speed is largely varied, but can be followed without problem in a case where the speed slowly varies at a feeding time along a circle or an arc.

Hereunder is described a controlling method utilizing the afore-mentioned pre-compensation system for the position loop of a servo-system of the numerical control device shown in FIG. 2.

Figure 11:
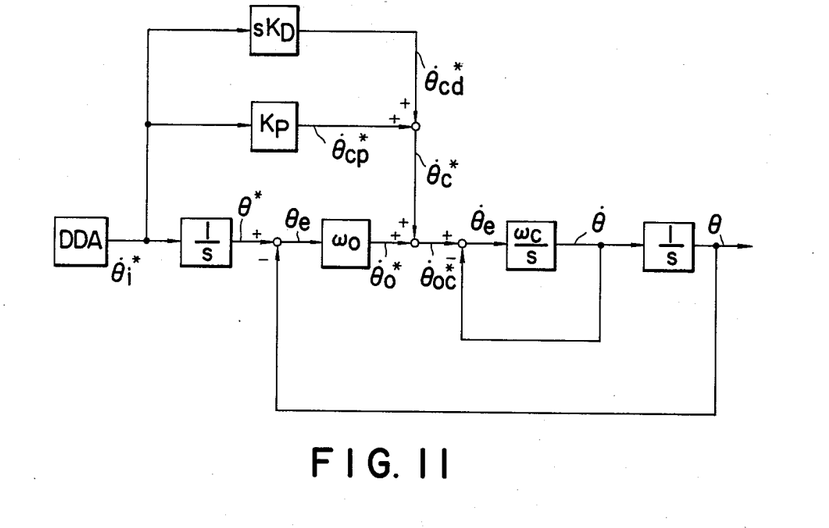
FIG. 11 is a block diagram of a servo-system constituted by adding proportional and differential amendments to the servo-system shown in FIG. 2.
Figure 12:
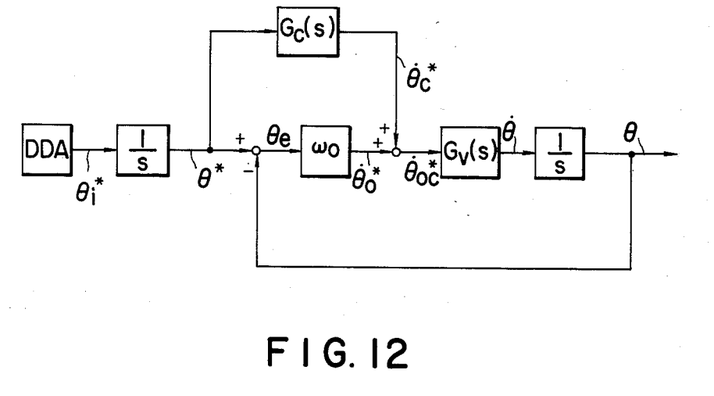
FIG. 12 is a rewriteen block diagram of that of FIG. 11.

An amendment in which proportional or differential element is front ended will be first explained with reference to FIG. 11, and in this case, an added value $\dot{\theta}_c^* = \dot{\theta}_{cp}^* + \dot{\theta}_{cd}^*$ where $\dot{\theta}_c^*$ is $K_P$ times speed command $\dot{\theta}_i^*$ and $\dot{\theta}_{cd}^*$ is $K_D$ times the differential value of the speed command $\dot{\theta}_i^*$ which is added to the speed command $\dot{\theta}_o^*$ to obtain the command $\dot{\theta}_{oc}^*$, which is then forwarded to the speed loop system as a speed command. The relationship $\dot{\theta}_e/\dot{\theta}^*$ between the position command $\dot{\theta}^*$ and the position deviation $\dot{\theta}_e$ in this occasion is required. In consideration of the fact that the content of FIG. 11 is rewritten to that of FIG. 12, a series of the following equations (17) through (22) will be established.

$$\dot{\theta}_e = \dot{\theta}^* - \dot{\theta} \quad (17)$$

$$\theta = \dot{\theta} \cdot \frac{1}{s} \quad (18)$$

$$\dot{\theta} = \dot{\theta}_{OC}^* \cdot G_V(s) \quad (19)$$

$$\dot{\theta}_{OC}^* = \dot{\theta}_O^* + \dot{\theta}_C^* \quad (20)$$

$$\dot{\theta}_C^* = \dot{\theta}^* \cdot G_C(s) \quad (21)$$

$$\dot{\theta}_O^* = \dot{\theta}_e \cdot \omega_O \quad (22)$$

$G_C(s)$ and $G_V(s)$ in these equations are as follows.

$$G_C(s) = \frac{\dot{\theta}_C^*}{\dot{\theta}^*} = s \cdot (s \cdot K_D + K_P) \quad (23)$$

$$G_V(s) = \frac{\dot{\theta}}{\dot{\theta}_{OC}^*} = \frac{\omega_C}{s + \omega_C} \quad (24)$$

Accordingly, when the equation (18) is substituted for the equation (17), an equation (25) is obtained.

$$\dot{\theta}_e = \dot{\theta}^* - \frac{\dot{\theta}}{s} \quad (25)$$

When the equation (19) is then substituted for the equation (25), the following equation (26) is obtained.

$$\dot{\theta}_e = \dot{\theta}^* - \frac{1}{s} \cdot \dot{\theta}_{OC}^* \cdot G_V(s) \quad (26)$$

Furthermore, in substitution of the equation (20) for the equation (26), an equation (27) is obtained.

$$\dot{\theta}_e = \dot{\theta}^* - \frac{G_V(s)}{s} \cdot (\dot{\theta}_O^* + \dot{\theta}_C^*) \quad (27)$$

Accordingly, in substitution of the equations (21) and (22), the following equations will be established.

$$\dot{\theta}_e = \dot{\theta}^* - \frac{G_V(s)}{s} \cdot (\dot{\theta}_e \omega_O + \dot{\theta}^* \cdot G_C(s)) \quad (28)$$

$$\left(1 + \frac{G_V(s) \omega_O}{s}\right) \dot{\theta}_e = \left(1 - \frac{G_V(s) \cdot G_C(s)}{s}\right) \dot{\theta}^* \quad (29)$$

$$\frac{\dot{\theta}_e}{\dot{\theta}^*} = \frac{1 - \frac{G_V(s) \cdot G_C(s)}{s}}{1 + \frac{G_V(s) \cdot \omega_O}{s}} = \frac{s - G_V(s) \cdot G_C(s)}{s + \omega_O \cdot G_V(s)} \quad (30)$$

When the relationship between the equations (23) and (24) is substituted for the equation (30), the following equation (31) will be finally obtained.

$$\frac{\theta_e}{\theta^*} = \frac{s - \frac{\omega_C}{s + \omega_C} \cdot s(sK_D + K_P)}{s + \omega_O \frac{\omega_C}{s + \omega_C}} = \quad (31)$$

$$= \frac{s(s + \omega_C) - \omega_C \cdot s(sK_D + K_P)}{s(s + \omega_C) + \omega_O \cdot \omega_C}$$

$$= \frac{s^2 + \omega_C \cdot s - \omega_C K_D \cdot s^2 - \omega_C K_P \cdot s}{s^2 + \omega_C \cdot s + \omega_O \omega_C} =$$

$$\frac{(1 - \omega_C K_D)s^2 + \omega_C (1 - K_P)s}{s^2 + \omega_C \cdot s + \omega_O \omega_C}$$

Figure 13:
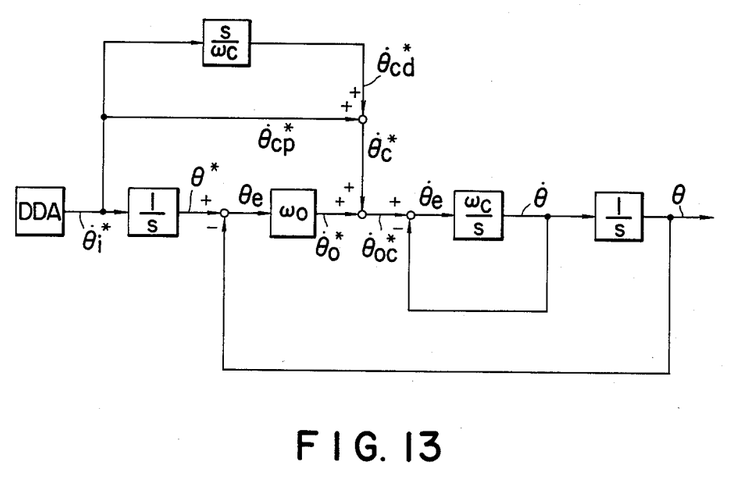
FIG. 13 is a block diagram representing a case where a system provided with a position deviation zero is induced from the servo-system shown in FIG. 12.

The relationship $\theta_e/\theta^*$ between the position command $\theta^*$ and the position deviation $\theta_e$ is thus obtained by the equation (31), and in this equation (31), providing that $K_P=1$ and $K_D=1/\omega_c$, the numerator becomes "0" and the equation $$\frac{\theta_e}{\theta^*} = 0 \quad (32)$$

is obtained. This means that the positional deviation $\theta_e$ of the servo-system is always "0" even through any positional command $\theta^*$ is inputted; that is, the servo-system can be completely followed up and operated exactly in accordance with the inputted position command. In use of these conditions, the block diagram of FIG. 2 will be rewritten to that as shown in FIG. 13.

Figure 14:
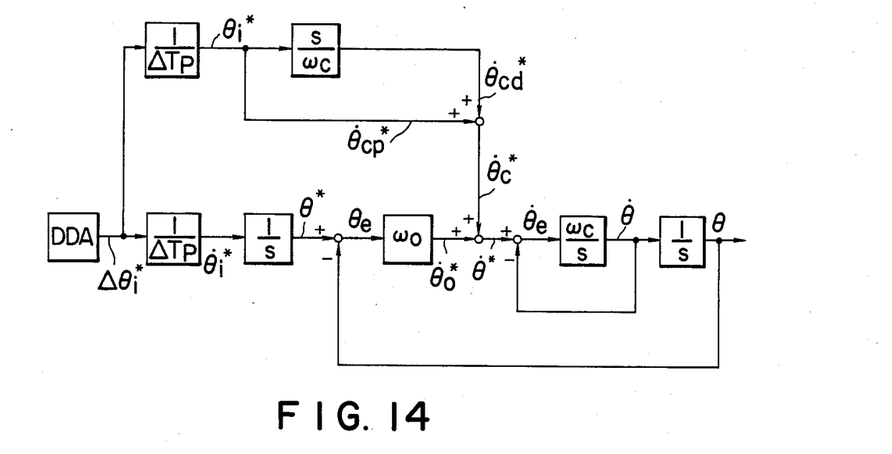
FIG. 14 is a block diagram of a servo-system utilizing the pre-compensation system according to this invention in a case of a sampling control method.
Figure 15:
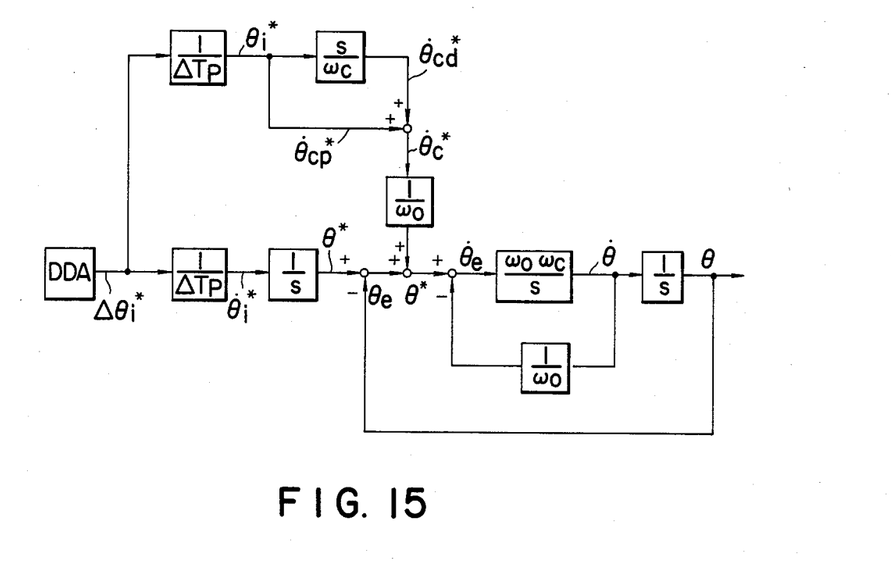
FIG. 15 is a block diagram in which a position loop gain of FIG. 14 is induced into a speed loop gain.

In the foregoings, although the disclosure is developed as a time series system, in an actual numerical control (NC), the controlling method according to this invention will be realized by a sampling method in use of a computer. In this stage, accordingly, an influence due to an amended portion is explained. The output of the DDA is not $\theta_i^*$ (rad/sec), but $\Delta\theta_i^*$ (rad/sample). The block diagram of FIG. 13 is rewritten to that of FIG. 14 in consideration of this fact. Moreover, the block diagram may be rewritten to that of FIG. 15 in a case where the position loop gain $\omega_o$ is introduced into the speed loop on account of the numerical treatment. In the block diagrams of FIGS. 14 and 15, $\Delta T_P(\sec)$ represents the distribution period of the DDA and $\Delta\theta_i^*$ (rad/sample) is the distribution amount amang the $\Delta T_P$.

Although in the prior art the servo-system is mainly realized by analog circuit means, it has been recently realized in many cases by digital circuit means in accordance the progress of digital computers. This invention is, however, available for both circuit means because this invention is considered from the initial time with no relation of the digital or analog circuit means which constitutes the servo-system. Thinking processes in application of the present invention to the digital circuit means will be explained hereunder through a preferred example, in which the term of digital circuit means includes a software system realized by a program of a computer as well as a circuit realized by a hardware. The transfer function W(z) of a control system constituted by the digital circuit is represented by the Z-conversion, and accordingly, the transfer function H(z) is expressed as follows.

$$H(z) = \frac{1}{W(z)} \cdot z^{-N} \quad (33)$$

Figure 16:
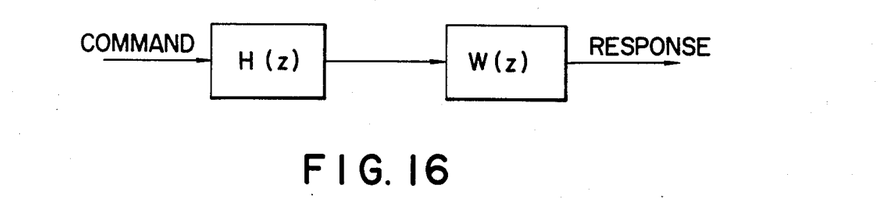
FIG. 16 is a block diagram of a general concept of a servo-system utilizing the pre-compensation system of this invention realized by a digital circuit.

In this equation (33), $z^{-N}$ means a time delay of $t = -NT$ time, where capital T is a sampling period in the digital circuit. A sevo-system compensated for by the transfer function H(z) of the pre-compensation system 10 is represented by the brief block diagram of FIG. 16.

Figure 17:
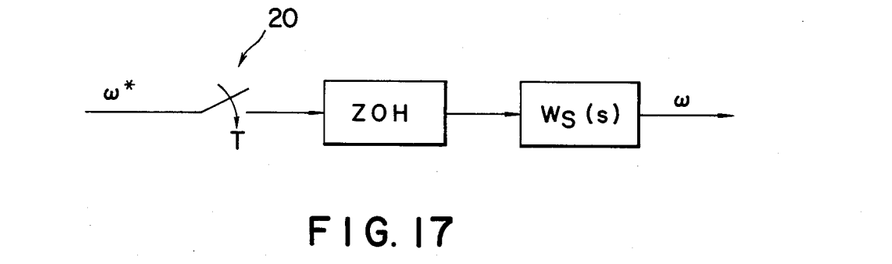
FIG. 17 is a block diagram showing a construction of an example in which a Z-conversion is effected to the transfer function W of the servo-system.

In the preferred example, the transfer function $H_s(Z)$ of the pre-compensation system 10 in case of constituting the speed control system $W_s(s)$ with the digital circuit is first led; that is, a sampler 20 having a sampling period T and a zero dimensional hold circuit ZOH as shown in FIG. 17 are induced to exhibit the speed control system $W_s(s)$ with the digital circuit thereby to effect the Z-conversion expressed by the following equation (34).

$$W_s(z) = z \left\{ \frac{1 - e^{TS}}{s} \cdot W_s(s) \right\} \quad (34)$$

In this equation (34), $Z\{ \}$ means the Z-conversion and $(1-e^{TS})/S$ is a transfer function of the zero dimensional hold circuit ZOH. The following equation (35) will be also established.

$$W_s(z) = \frac{b \cdot z^{-1}}{1 - a \cdot z^{-1}} \quad (35)$$

in which $$a = \exp\left(-\frac{D + G_s}{J} T\right) \text{ and } b = \frac{G_s}{D + G_s} \cdot (1 - a).$$

The transfer function $H_s(z)$ to be required is obtained by substituting the equation (35) for the equation (33) as follows.

$$H_s(z) = \frac{1 - a \cdot z^{-1}}{b \cdot Z^{-1}} \cdot z^{-N} \quad (36)$$

In the equation (36), in case of N=1 for maintaining the causality of the pre-compensation system 10, the following equation (37) will be obtained.

$$H_s(z) = \frac{1}{b} \cdot (1 - a \cdot z^{-1}) \quad (37)$$

Figure 18:
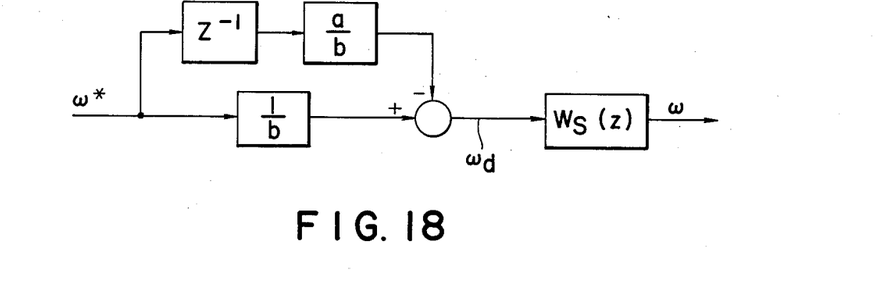
FIG. 18 is a block diagram of one example of a servo-system compensated for by the pre-compensation system $H_s(Z)$ according to this invention.

According to the equation (37), a system compensated for by the transfer function $H_s(Z)$ is represented by a block diagram shown in FIG. 18.

As described hereinbefore, according to this invention, the output response to the inputted speed or position command can be fully followed up. In addition, since the response in the respective servo-systems can be controlled with no delay, it becomes possible to precisely control one object in harmonization of a plurality of servo-systems. Particularly, in a case where the servo-system of this character is utilized for a numerical control device for a machine tool, a working operation with substantial no working error can be realized in the circle or arc cutting process.

It should be understood that many modifications and adaptations of the invention will become apparent to those skilled in the art and it is intended to encompass such obvious modifications and changes in the scope of the claims appended hereto.

What is claimed is:

1. A full follow-up type servo-system wherein when a transfer function of a servo-system comprising a control system and an object to be controlled is designated by W, said control system is preceded by a pre-compensation system with an inverse function 1/W of said transfer function W thereby to input a control command into said pre-compensation system.

2. The full follow-up type servo-system according to claim 1 wherein said control command is a command regarding a speed.

3. The full follow-up type servo-system according to claim 1 wherein said control command is a command regarding a position.

4. The full follow-up type servo-system according to claim 1 wherein said pre-compensation system comprises proportional and differential elements.

5. The full follow-up type servo-system according to claim 1 is of the type of a digital system including a system for carrying out a Z-conversion.

6. The full follow-up type servo-system according to claim 5 wherein said Z-conversion system comprises a sampler and a zero dimensional hold circuit.

* * * * *